United States Patent [19]

Roehrick

[11] 4,175,513
[45] Nov. 27, 1979

[54] QUICK STEP ECOLARIUM

[76] Inventor: Otto A. Roehrick, 1333 Elkhorn Blvd., Rio Linda, Calif. 95673

[21] Appl. No.: 729,306

[22] Filed: Oct. 4, 1976

[51] Int. Cl.² .............................................. A01K 64/00
[52] U.S. Cl. ..................................................... 119/5
[58] Field of Search .............. 119/5; 40/133 R, 152.2; 312/223

[56] References Cited

U.S. PATENT DOCUMENTS

| | | | |
|---|---|---|---|
| 1,838,215 | 12/1931 | DeClairmont | 119/5 |
| 2,195,977 | 4/1940 | Sunderhauf | 40/133 R |
| 3,119,371 | 1/1964 | Zuckerman | 119/5 |
| 3,730,138 | 5/1973 | Suchowski | 119/5 |
| 3,783,544 | 1/1974 | Brody | 40/152.2 |
| 4,006,711 | 2/1977 | Frank | 119/5 |
| 4,044,721 | 8/1977 | Foley et al. | 119/5 |

FOREIGN PATENT DOCUMENTS

| | | | |
|---|---|---|---|
| 1045329 | 11/1951 | France | 119/5 |
| 1267479 | 6/1961 | France | 119/5 |
| 1030966 | 5/1966 | United Kingdom | 119/5 |

*Primary Examiner*—Louis G. Mancene
*Assistant Examiner*—Daniel J. Leach

[57] ABSTRACT

An improved means of lighting and lightscaping a container of the transparent viewing variety principally used for the simultaneous display of aqueous and terraneous culture. The means is adaptable to aquariums and terrariums in separate forms consisting of a light chamber with removable drawers containing the light bulbs, and includes means of engaging electrical current when the light drawers are closed and means of dispensing said light within the container by means of ornamental light dispensing sculptures within said container.

11 Claims, 8 Drawing Figures

U.S. Patent  Nov. 27, 1979  4,175,513
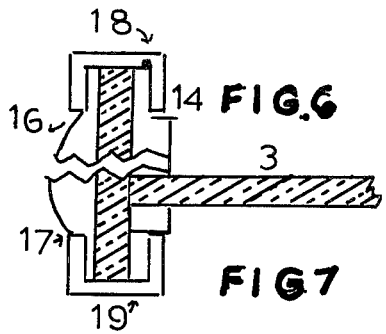
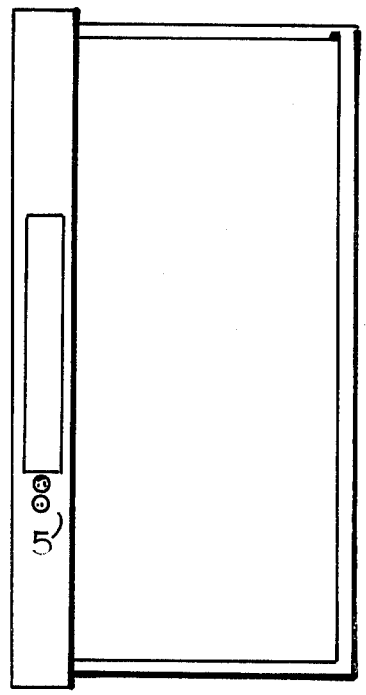
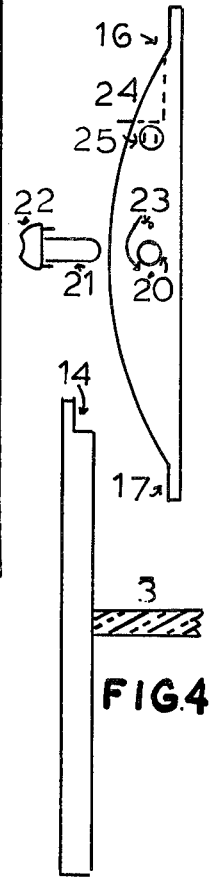
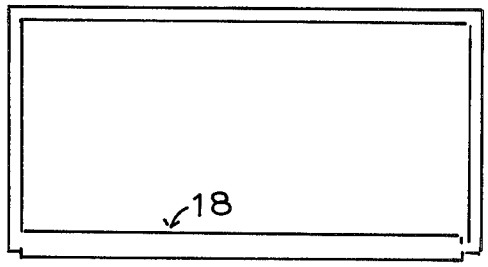
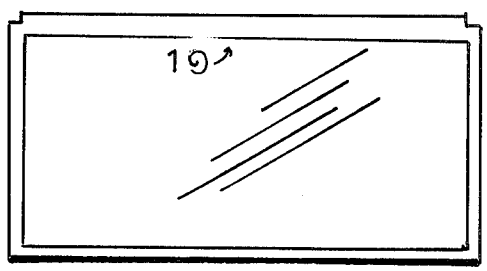
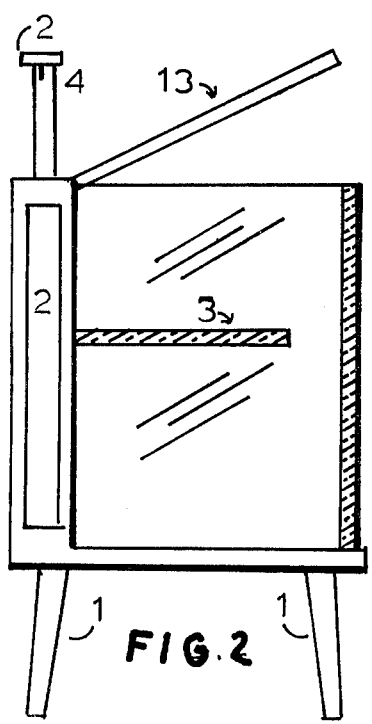
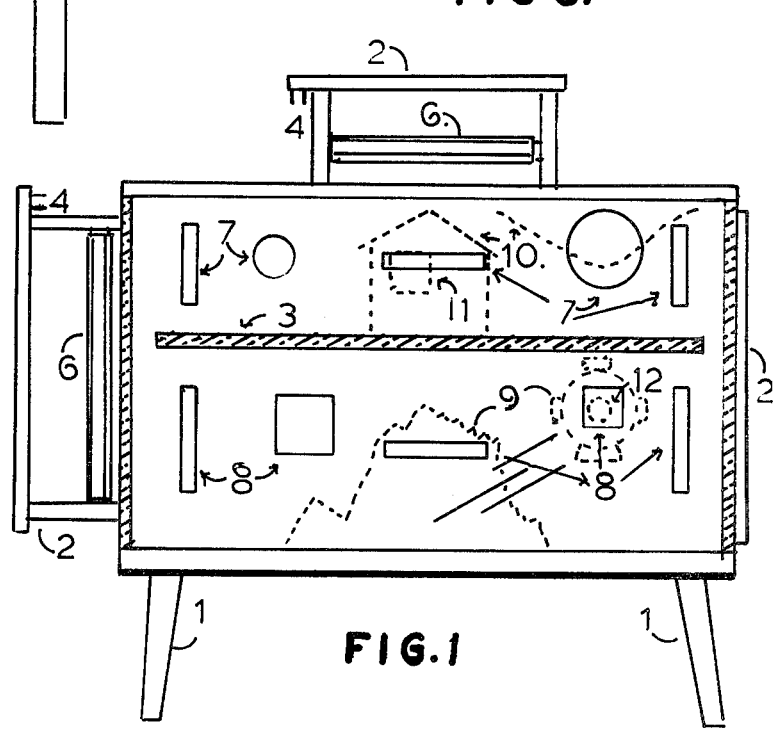

QUICK STEP ECOLARIUM

RELATION TO OTHER PATENTS

The subject matter of this application is related to and is an improvement to my U.S. Pat. Nos. 4,133,024 and 4,081,666 and intended for utilization with applications 810,204 and 657,706, now continuation application 954,654.

BACKGROUND OF THE INVENTION

In recent years an ever greater number of people have become interested in ecology, the balancing of the worlds environment and its esthetic beauty. It is also necessary for many of these people to live in confined areas such as apartments and high-rises. In order to keep in touch with nature thay have been turning in ever growing numbers to hobbies involving aquariums, terrariums and hanging baskets. In search for greater beauty, many simulated devices have been made for aquariums such as simulated waterfalls, backgrounds, treasure troves and sunken ships. They are also using larger and larger tanks to display these simulated devices in. Many devices have been patented to improve and maintain the aquarium hobby.

One of these patents is British Pat. No. 1,030,966 to Wadkin. Also, French Pat. No. 1,045,329 to Gardner. Also, U.S. Pat. No. 3,783,544 to Prody, also, U.S. Pat. No. 3,730,138 to Suchowski and others.

None of these individually or collectivly anticipate or are intended for use in an Ecolarium (ecology tank)

The instant invention and application are alternate means of assembling and providing the functions of a new hobbie I am promoting. Environmental and esthetic ecology in a tank. Hence, the word Ecolarium (ecology tank). It is the purpose of my ecology tanks to beneficially use, combine and control for invironmental purposes and esthetic beauty all the basic factors of life and make them a part of a new containerized hobby simple enough for any one of ordinary skills to use, yet versatile enough to be enjoyed by even those of very sophisticated skills and desires.

It is also intended that all the basic factors of life be used and controlled for health and beauty and to compliment the other.

These factors are:
Air
　Water
　　Light
　　　Darkness
　　　　Earth

The effects of these on each other plus their effects on,
　Plant life
　Water life
　Earth life
　Micro-organisms and the contribution of all of them on the environment and cycle of life. To do this I employ a container or collection of containers having basic compartments. In the instant application the disclosure is concerning the light chamber for the ecology tank.

SUMMARY OF THE INVENTION

In brief, the instant invention relates to an Ecolarium (ecology tank) assembly. In the interest of brevity and ease of understanding, I will henceforth refer to it as a ecology tank. The operative components referred to specifically include lighting ornamentation and assembly of larger ecology tanks.

It is the primary object of this invention to provide ecology tanks so simple in construction and maintenance that anyone of ordinary skills can enjoy them. Another object is to enable the hobbiest to create a wide variety of potential art and light designs without taking it apart to change the scene.

Still another object is to control algae growth, inhibit its growth on viewing areas yet intensify its growth in hidden areas.

Another object is to enable one to use a wide variety and versatile selection of light dispensing objects for ornamentation and illumination.

Still another object is to provide a light chamber with an even distribution of light and distributing said light to ornamental light dispensing objects and simultaneously using said chamber to eliminate excess electrical cords.

Another object is to be able to simply change the light bulbs without disturbing the ecology tank.

These and other objects of the invention will in part be obvious and will in part appear herein after.

The invention accordingly comprises the product possessing the features. Properties and relation of components which are exemplified in the following detailed disclosure and the scope of the application which will be indicated in the claims.

For a fuller understanding of the nature and objects of the invention reference should be had to the following detailed description taken in conjunction with the drawings.

BRIEF DESCRIPTION OF THE DRAWINGS

FIG. 1 is a front view of the console ecology tank.
FIG. 2 is an end view of said console ecology tank.
FIG. 3 is a top view.
FIG. 4 is the inside panel of the table model which also contains a shelf.
FIG. 5 is the removable light chamber from the table model.
FIG. 6 shows the top frame construction.
FIG. 7 is the bottom frame construction.
FIG. 8 the frame design in an open position.

DESCRIPTION OF THE PREFERRED EMBODIMENT

The ecology tank of Ser. No. 645,376 filed Dec. 30, 1975, and Ser. No. 657,706 filed Feb. 12, 1976, combine both water culture and earth culture as well as ornamental waterscapes, earthscapes, airscapes and lightscapes requiring an ecologically balanced system. The challenge of blending all of the components for a total visual effect and operational capability within the ecology tank was indeed a complex problem. The novel stand containing the light chamber and the light dispensing ornamental objects within the container are seen to be the solution for the problem; all components being readily available for access to the owner of the ecology tank.

Since an ecology tank has an aqueous area and a terraneous area, the latter being above the former, getting light to the aqueous portion presented no small problem. The front and side areas being reserved for viewing and light from the top did not penetrate the terraneous shelf.

I therefore designed a hood that hung downward from the top on the back of the tank. In doing this I was able to simultaneously illuminate both the terraneous shelf and the aqueous portion. This worked very well for smaller tanks that could easily be moved for removing the back cover. But, the trend is for larger and larger tanks.

Getting to the bulbs for replacement without moving the tank was a factor I had to solve and also distribution of light evenly over a wide area posed a problem, the light chamber with the drawer-like light holders was the solution. The light now could be extended inward to a predetermined distance so that they would distribute light evenly throughout the entire chamber. The light chamber would have a non-transparent back wall and a non-transparent front wall. Now by drilling holes in the front wall I could dispense light to any given area of either the aqueous portion or terraneous portion.

Now I could control the light for both visual and environmental effects. As an example, note FIG. 1 #8, these are light vents of various sizes and shapes located at predetermined positions on the front panal for dispensing light from the light chamber. Now how is this light controlled? First the light is already somewhat defused since the light vents are not directly in front of the bulbs. Now to further control this light for beauty and environmental effect, I place various ornamental objects in front of these light vents, note #9. This may be in the form of a rock, submarine, diving bell, sunken ship, snails, clams or any other aqueous ornament. Now, the light is further defused and controlled, the backside of the ornament being the recipient of the direct light rays. The algae growth is thus intensified behind the ornament, aiding in water purification and providing fish food to the fish, while none grows on the front side or on the glass front and side panels of the container. Now how does it work with diving bells, submarines and other devices? Having light dispensing portholes or apertures these objects would have fronts and sides, but no backsides, they would be positioned against the back glass of the container over the light vents, the algae growth would thus be on the inside of the ornament not on the outside, the fish could swim in and out of the light dispensing apertures (#12) to consume the algae.

Above the terraneous shelf (#3 in FIGS. 1 and 2) simular light vents (#7) would dispense light to the terraneous area. Here landscaping would blot out some light vents or portions of them. Dotted lines (#10) depict a house or mountain on the landscaped area. By placing colored cellophane or staining the glass in front of the circle light vent on the right side and landscaping a mountain in front on the terraneous tier one would have a sunrise or sunset. Shading clouds on the glass would create light shining from behind the clouds. A house or other building or even a series of buildings with cutouts for windows placed in front of these slots would lightscape the landscape of the terraneous shelf of the ecology tank. By using dark paper or other opaque material some of the light vents not needed would be blotted out. By cutting star shaped holes one could have a stary sky, etc., or campfires or any other beautiful night scene. Any beautiful day or night scene can be had. The lid (#13 in FIG. 2) which is hinged to the back of the tank is brought down over the tank to hold it in place.

The table model is built with similar simplicity. It consists of a tank containing a bottom frame (FIG. 8) with an extra wide rim on the backside (#19). The upper frame (FIG. 7) also contains a wide back frame (#18). This width is also extended inward to allow enough space for holding a standing Ecolarium in place (FIG. 4 in the drawings).

FIG. 7 and FIG. 8 are the bottom and top frames opened in a clam shell fashion to show their relationship to one another. In manufacture of the tank the top frame is left free from the container, the container being made of transparent material. The stand having the shelf and light dispensing cutouts is placed inside the container, the shelf (#3) facing forward. The light chamber (#5) is mounted on the outside. FIG. 6 shows that by inserting lip (#17) into slot (#19) the upper frame then being placed on the top of said tank would hold both the stand containing the shelf and the light chamber in place. One cord runs to the light chamber. It would contain a light plug that would have a reverse socket with the plug pins facing the same direction as the bulb (#21 and #22). As the light (#21) is inserted into the socket on either side of the opening completing the circuit and holding said socket in place.

For bulb change all one must do is pull out, replace bulb, and push back in. The light chamber may have an indentation (#24) to hold a pump, also a receptacle for which to insert plug (#24). Thus there is provided a light chamber capable of lightscaping a miniature world in combination with waterscaping, landscaping and airscaping of unlimited variations of design where in the aquatic portion of the lower compartment may be simultaneously water and lightscaped. The defused light dispensation may be at any predetermined location as long as the ornamental light dispensing object has an open backside circumferencing the light vent of the light chamber.

In like manner the terrestrial portion may simultaneously be light, air and landscaped with ornamental devices having non-transparent front and top members, as well as non-transparent side members, no backside, with ornamental light dispensing apertures from the solid members at predetermined locations.

While I have described several preferred embodiments of my invention for the purpose of illustration, it should be understood that other modifications and adaptations thereof may be made within the spirit of the invention and in no manner to be construed as a limitation.

I claim:

1. For an ecology tank system comprising a lower aquarium compartment and a terrarium upper compartment, said compartments being separated by a shelf or platform horizontally disposed therebetween, in combination:

(A) means for supporting said tank and controlling the light to said tank for illuminating ornamentation and algae control, the combination comprising a stand, a vertical light chamber rising upward from the back of said stand having an external shape corresponding to the external shape and size of said ecology tank, said light chamber having an opaque back wall, opaque bottom member with end and top members having apertures therein for receiving light drawers, the front wall of said light chamber having light dispensing apertures of predetermined size and shape and locations, said light chamber containing an electrical circuit with a female outlet at each drawer opening and at least one additional outlet, (B) light drawers extending the light bulbs inward from the side and top walls to a predetermined location said light drawers having the male connector for engaging said light when the drawer is closed, (C) ornamental light dispensing objects to be used on the inside of said ecology tank having bottom and top walls a front wall, side walls, and no back wall, the front and side walls having at least one ornamental light dispensing aperture.

2. A light chamber and ornamental light dispensing objects as in claim 1 being affixed to the back of said ecology tank in combination with means supporting the terrarium shelf on the inside of the ecology tank, said means being the front opaque panel having light dispensing apertures.

3. A light chamber and ornamental light dispensing object as in claim 1 having incandescent sockets and the male connector rather than light drawers.

4. A light chamber and ornamental light dispensing object as in claim 1 for use with an aquarium.

5. A light chamber as in claim 1 for use with a terrarium.

6. Ornamental light dispensing sculptures having non-transparent tops, bottom members, and side members, a non-transparent front member having at least one light dispensing aperture.

7. Ornamental light dispensing objects as in claim 6 made of plastic.

8. Ornamental light dispensing objects as in claim 6 made of ceramic.

9. Ornamental light dispensing objects as in claim 6 made of glass.

10. Ornamental light dispensing objects as in claim 6 made of wood.

11. Ornamental light dispensing objects as in claim 6 made of metal.

* * * * *